United States Patent [19]

Blaschke

[11] 3,809,425
[45] May 7, 1974

[54] KITCHEN ACCESSORY FOR AUTOMOBILES

[76] Inventor: Anthony J. Blaschke, 1320 State Fair, Sedalia, Mo. 65301

[22] Filed: Nov. 6, 1972

[21] Appl. No.: 304,088

[52] U.S. Cl.............. 296/22, 135/4 A, 224/42.1 E
[51] Int. Cl............................................. B60p 3/02
[58] Field of Search.................. 296/22, 3, 6, 7, 10; 224/42.1 R, 42.1 E, 42.1 H; 135/1 A, 4 A

[56] References Cited
UNITED STATES PATENTS

| | | | |
|---|---|---|---|
| 3,715,044 | 2/1973 | Simons | 224/42.1 E |
| 3,495,729 | 2/1970 | Kruse | 224/42.1 H |
| 3,186,420 | 6/1965 | Magee | 224/42.1 R |

Primary Examiner—Philip Goodman
Assistant Examiner—John A. Carroll
Attorney, Agent, or Firm—John A. Hamilton

[57] ABSTRACT

A kitchen accessory for automobiles consisting of a rectilinear case having two hingedly related halves, the case being adapted to be disposed above an automobile in the manner of luggage in a luggage rack, but connected permanently to the automobile by a track device such that it may be moved to and supported in a position at one side of the automobile, and opened, whereby one half thereof is disposed horizontally, opening upwardly and may carry a camp stove and fuel supply, and the other half is disposed vertically, rising from the inner edge of the stove half and opening outwardly, and may carry shelves for food supplies and the like.

4 Claims, 8 Drawing Figures

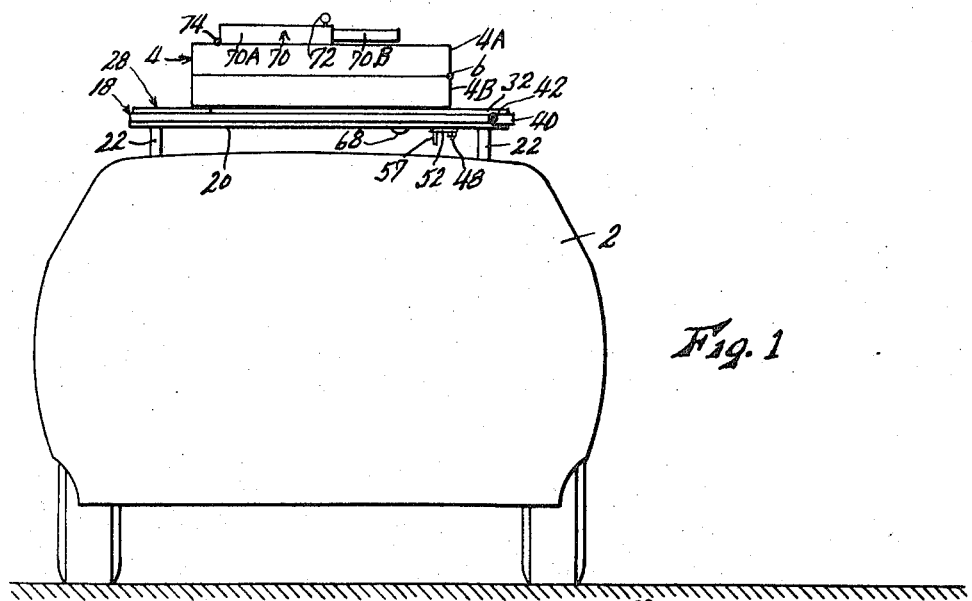
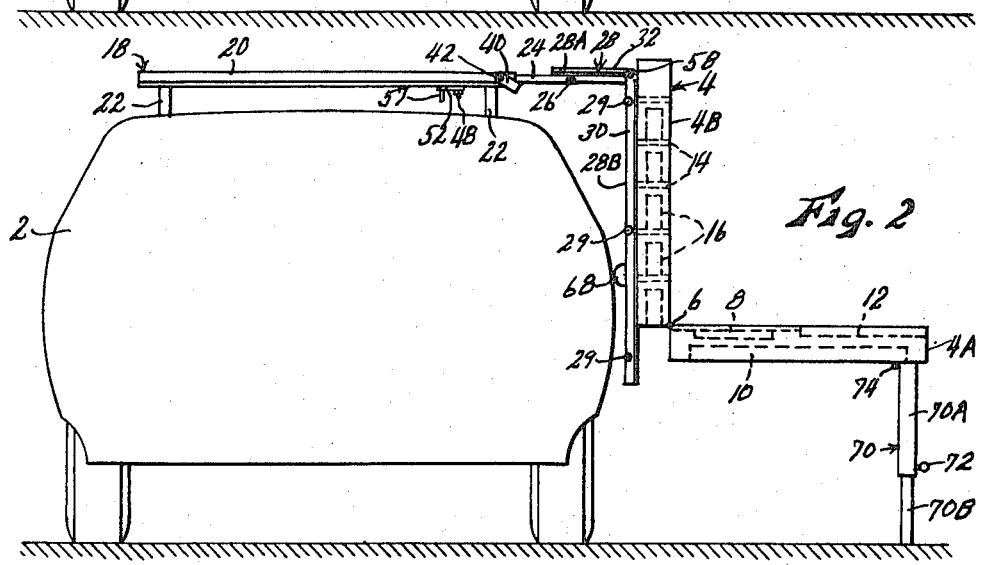
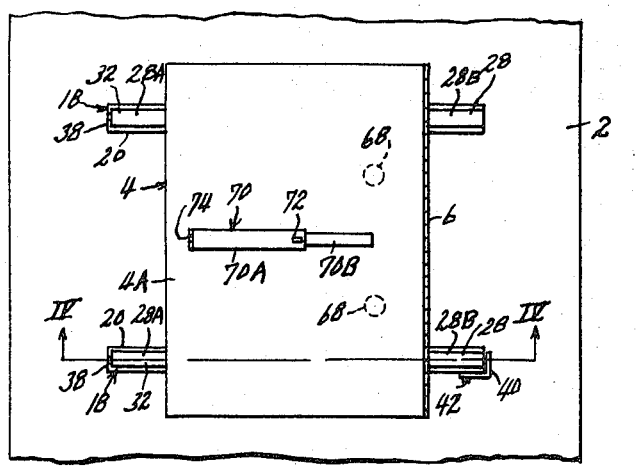

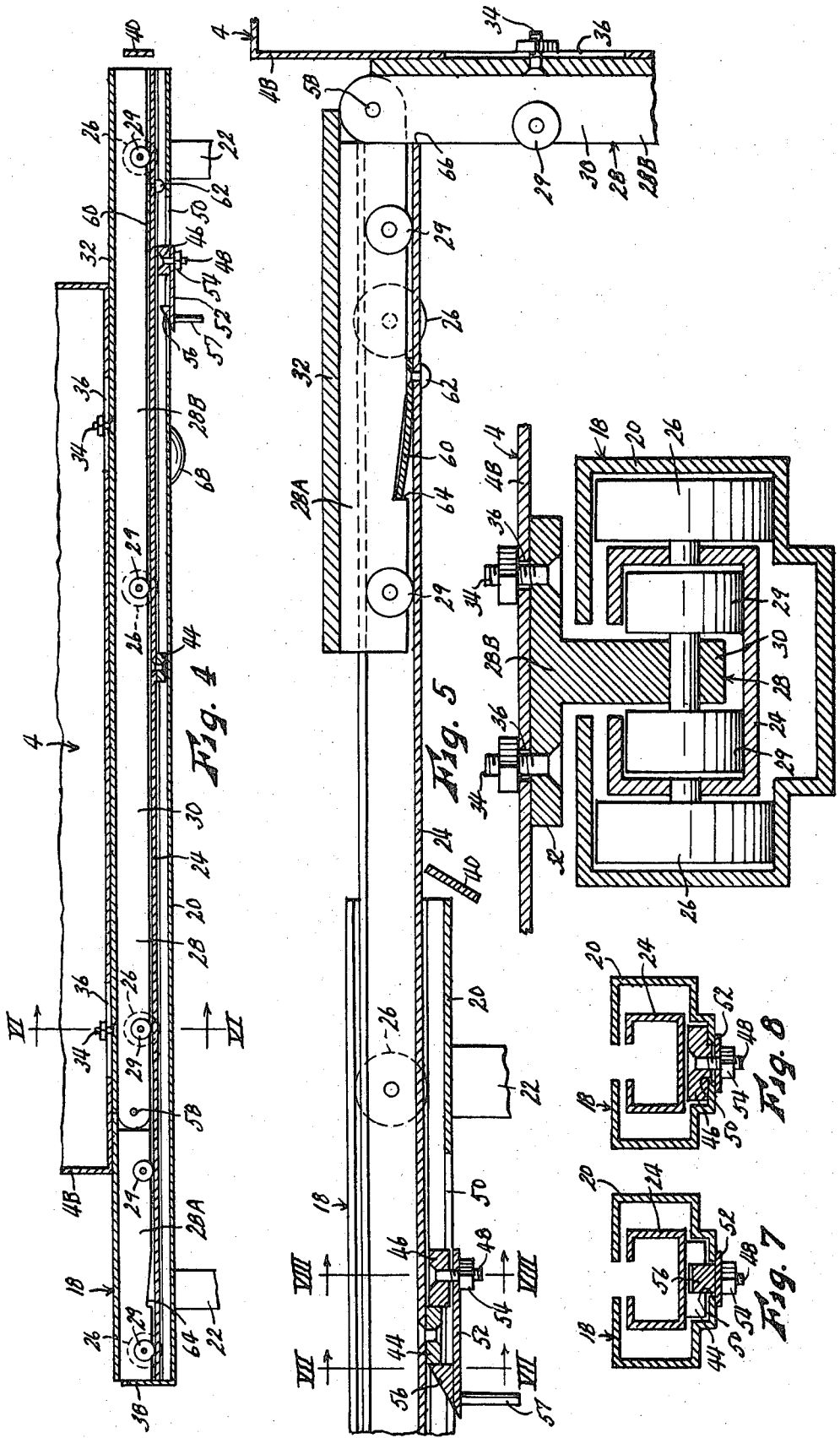

KITCHEN ACCESSORY FOR AUTOMOBILES

This invention relates to new and useful improvements in accessories for automobiles, and has as its principal object the provision of a chest or case adapted to carry a camp stove, fuel supply, food supply, eating utensils and the like, and means connecting said case to said automobile whereby the former, while permanently attached to the automobile, may be easily and conveniently moved between a use position at the side of the automobile to a storage and transportation position over the roof of the vehicle.

Another object is the provision of an accessory of the character described in which the case consists of hingedly related sections, which may be closed to conceal and protect the contents thereof, and which when open, displays the contents thereof in a normal position for convenient usage.

Other objects are simplicity and economy of construction, and efficiency and dependability of operation.

With these objects in view, as well as other objects which will appear in the course of the specification, reference will be had to the accompanying drawing, wherein:

FIG. 1 is an end elevational view of an automobile, shown in outline, with a kitchen accessory embodying the present invention mounted operatively thereon, and shown in its storage and transportation position, FIG. 2 is a view similar to FIG. 1, but showing the accessory in its use position, FIG. 3 is a fragmentary plan view showing the accessory in its storage and transportation position as in FIG. 1, FIG. 4 is an enlarged, fragmentary sectional view taken on line IV—IV of FIG. 3, FIG. 5 is a still further enlarged view showing the right end portion of FIG. 4, with the accessory extended to its use position, FIG. 6 is an enlarged, fragmentary sectional view taken on line VI—VI of FIG. 4, FIG. 7 is an enlarged sectional view taken on line VII—VII of FIG. 5, and FIG. 8 is an enlarged sectional view taken on line VIII—VIII of FIG. 5.

Like reference numerals apply to similar parts throughout the several views, and the numeral 2 applies to an automobile, shown in end elevation in FIGS. 1 and 2. The kitchen elements are contained in a rectilinear case indicated generally by the numeral 4, which is adapted normally to be disposed above the vehicle in the manner of luggage in a top luggage rack, as shown in FIGS. 1 and 3. It resembles a large suitcase, and may be formed of sheet metal or any other generally rigid material, being divided into two sections 4A and 4B, connected by a hinge 6, so that it may be opened and closed. When positioned normally above the automobile and closed, section 4A is disposed above section 4B, and hinge 6 is disposed at the longitudinal edge thereof toward the side of the automobile to which the case will be moved for use. Section 4A may contain a camp stove burner 8, a tank 10 for burner fuel, such as a liquid petroleum gas, and a food preparation table 12, or other similar items. When section 4A is disposed horizontally in an upwardly opening position, as in FIG. 2, burner 8 and table 12 are in position for use. Ssection 4B may include shelves 14 for carrying food containers 16, eating utensils, or the like. These shelves are upright when, as shown in FIG. 2, section 4B is disposed vertically. Closure of the case causes section 4A to close the front of section 4B to retain containers 16 on shelves 14, so that the case, when closed, can be moved to any position.

Case 4 is attached to and supported on automobile 2 by a pair of track assemblies each indicated generally by the numeral 18 extending transversely and horizontally above the roof of the car body, in fore-and-aft spaced relation. Each track assembly includes an outer or base section 20, of upwardly opening C-shaped cross-sectional contour, provided adjacent each end with a depending leg 22, the lower end of which is affixed to the automobile roof by any suitable means, an intermediate section 24, also of upwardly opening C-shaped cross-sectional contour, supported within the base section for longitudinal movement relative thereto by rollers 26 carried rotatably by the intermediate section, and an inner section 28 of T-shaped cross-sectional contour having a vertical leg 30 depending within intermediate section 24 and a horizontal T-head 32 disposed above base section 20. Inner section 28 is supported movably in the intermediate section by rollers 29. Case section 4B is attached to T-head 32 by bolts 34 (see FIGS. 4 and 6) which extend through elongated slots 36 formed in the wall of said case section, said slots being parallel to the track.

Assuming that case 4 is to be moved to a use position at te right of the automobile, as shown in FIG. 2, the left end of base sections 20 of the tracks are each closed by an end wall 38, so that intermediate section 24 and inner section 28 cannot emerge from that end of said base section. The intermediate and inner sections are both of such length as to coincide with the length of the base section. A keeper latch 40 is pivoted at 42 to the right end of the base section 20 of at least one of the track assemblies, and is selectively movable between an operative position (see FIGS. 1, 3, and 4) in which it obstructs the open right end of the base track section and retains the intermediate and inner track sections within the base section, and an inoperative position (see FIGS. 2 and 5) wherein it does not obstruct the end of the base section, so that the intermediate and inner sections may be extended therefrom. Keeper latches 40 could be provided for both track assemblies if desired.

To move the case 4 to its use position, keeper latch 40 is first moved to its inoperative position, and intermediate sections 24 of both track assemblies are extended outwardly to the right of the automobile, as permitted by rollers 26, until a lug 44 affixed to the bottom of one of said intermediate sections abuts a mating lug 46 affixed to the bottom wall of the associated base track section 20, as shown in FIG. 5. Lug 44 is affixed adjustably in said base section by a bolt 48 extending downwardly through a longitudinally elongated slot 50 formed in the bottom wall of the base section, through a leaf spring 52 abutting the exterior surface of said bottom wall, and secured by a clamping nut 54. Leaf spring 52 extends to the left, and its provided at its opposite end with a tapered latch tooth 56 affixed thereto and projecting upwardly through slot 50 in spaced relation from lug 46. Thus as the intermediate section is extended lug 44 engages and deflects latch tooth 56 downwardly to pass thereover, but the latch tooth then snaps upwardly to trap lug 44 between itself and lug 46, so that the intermediate rail section is locked at a fixed degree of extension. Here again, both of the track assemblies could be provided with the lugs 44-46 and latch tooth 56 if desired. Intermediate track sections 24 must extend to the right beyond the side of the automobile, and since modern automobile bodies "bulge" outwardly at their sides to greater or lesser distances, the extension of the intermediate track sections must be adjustable. This adjustment is obtained by loosening bolt 48 and moving it along slot 50 of the base track section. Latch tooth 56 may be manually released by means of a handle 57 affixed to leaf spring 52.

Next, inner track sections 28 are extended from their corresponding intermediate track sections 24 to the right, as permitted by rollers 29. The inner track section 28 is divided adjacent its left end into a relatively short section 28A and a relatively long section 28B, the latter constituting a major portion of its length. Sections 28A and 28B are connected by a horizontal transverse pivot 58. Case 4 is connected by bolts 34 to sections 28B only. The inner track members 28 are extended from the intermediate sections, to the right, until only the shorter sections 28A thereof are retained within said intermediate sections, with portions 28B entirely free of the intermediate sections. At this time, the left end of a leaf spring 60 which is fixed, as at 62, at its right end to the floor of intermediate track section 24, rises resiliently into a notch 64 formed in the lower edge of the T-leg 30 of portion 28A of the inner track, as shown in FIG. 5, thereby locking the inner track section against any further extension.

Track sections 28B are then pivoted downwardly to a vertical position as shown in FIG. 2. The engagement of sections 28B with the extreme ends of intermediate track section 24, at point 66 as shown in FIG. 5, then locks the inner track sections against any inward movement in the intermediate track sections, and all sections of the tracks are firmly secured in fixed relation, to provide stability for case 4. As track sections 28B are pivoted downwardly and reach a vertical position, bumpers 68 affixed to the outer surface thereof engage the side of the automobile, as shown in FIG. 2. A true vertical positioning of track sections 28B at this time may be obtained by loosening nut 54 and moving lug 46 as already described.

Case 4 may then be opened, section 4A being pivoted outwardly and downwardly on hinge 6 to a horizontal position, as shown in FIG. 2, where it is supported by a ground engaging leg 70 depending therefrom. Said leg comprises a pair of slidably telescoped portions 70A and 70B, so that the length thereof may be adjusted by set screw 72. The height of case portion 4A above the ground, and of the cooking burner 8 and table 12 carried thereby, may be adjusted to the individual preferences of each user by loosening bolts 34 and moving case section 4B vertically along track sections 28B, with corresponding changes in the length of leg 70 to maintain case section 4A horizontal. Leg 70 may be pivoted to case section 4A, as at 74, so as to lie against said case section when not in use, and on top of the case when said case is in its transport position over the automobile, as in FIG. 1.

While I have shown and described a specific embodiment of my invention, it will be readily apparent that many minor changes of structure and operation could be made without departing from the spirit of the invention.

What I claim as new and desire to protect by Letters Patent is:

1. A kitchen accessory for an automobile comprising:

a. a rectilinear case consisting of hinged sections adapted to be disposed for use at one side of the automobile so that when open, one section thereof is disposed in vertical, outwardly opening relation closely adjacent the car body and the other section is disposed in horizontal, upwardly opening relation extending outwardly from the lower edge of said one section, b. kitchen accessories such as food supply shelves, burner, fuel supply and the like carried by the sections of said case, and c. an extendable pivoted track assembly affixed to the top of the automobile body, and to said case, whereby said case may be moved between said use position and a storage position directly above said automobile body, said one case section, when said case is in its storage position, being disposed beneath said other case section, said sections being hinged together at the side thereof closest to and parallel with the side of the automobile at which the case is disposed when in its use position, said track assembly being elongated transversely of the automobile, beneath said case, and including a plurality of sections longitudinally movable relative to each other, said track sections including a base section affixed to the automobile body, an intermediate section mounted in and movable relative to said base section for extension therefrom, and an inner section mounted in and movable relative to said intermediate section for extension therefrom, said inner track section having first and second portions pivoted together on a transverse axis, said first portion being entirely extendable from said intermediate section so that it may pivot downwardly when extended, while said second portion is retained within said intermediate track section, said case being affixed to said first portion of said inner track section.

2. A kitchen accessory for an automobile as recited in claim 1 with the addition of:

a. locking means operable to limit the outward extension of said inner track section relative to said intermediate track section, inward movement of said inner track section being prevented by the proximity of the downwardly pivoted first portion of said inner track section to the extended end of said intermediate track section, and b. locking means operable to engage and releasably secure said intermediate track section at a fixed degree of extension from said base track section, said lastnamed locking means being adjustable to permit variation of the locked extension of said intermediate track section.

3. A kitchen accessory for an automobile as recited in claim 2 with the addition of a third locking means operable when engaged to secure both said intermediate and inner track sections against extension from said base track section.

4. A kitchen accessory for an automobile as recited in claim 2 wherein said one case section is affixed to said first portion of said inner track section by means permitting adjustable movement thereof longitudinally along said first inner track portion.

* * * * *